(12) United States Patent
Chappell et al.

(10) Patent No.: US 9,770,012 B2
(45) Date of Patent: Sep. 26, 2017

(54) CINCH GRIP LEASH WITH LOCKING POSITIONABLE HAND GRIP

(71) Applicants: Morgan L. Chappell, Gilroy, CA (US); James A. Starr, Soquel, CA (US)

(72) Inventors: Morgan L. Chappell, Gilroy, CA (US); James A. Starr, Soquel, CA (US)

( * ) Notice: Subject to any disclaimer, the term of this patent is extended or adjusted under 35 U.S.C. 154(b) by 163 days.

(21) Appl. No.: 14/855,015

(22) Filed: Sep. 15, 2015

(65) Prior Publication Data

US 2016/0073613 A1   Mar. 17, 2016

Related U.S. Application Data

(60) Provisional application No. 62/051,418, filed on Sep. 17, 2014.

(51) Int. Cl.
*A01K 27/00* (2006.01)

(52) U.S. Cl.
CPC .................... *A01K 27/004* (2013.01)

(58) Field of Classification Search
CPC ..... A01K 27/004; A01K 27/005; A01K 27/00
USPC .................................................. 119/796, 797
See application file for complete search history.

(56) References Cited

U.S. PATENT DOCUMENTS

| | | | | | |
|---|---|---|---|---|---|
| 4,391,226 | A | * | 7/1983 | Guthrie | A01K 27/005 119/797 |
| 4,562,792 | A | * | 1/1986 | Pak | A01K 27/004 119/797 |
| 6,216,641 | B1 | * | 4/2001 | Tracy | A01K 27/003 119/797 |
| 7,484,273 | B1 | * | 2/2009 | Dupree | A01K 27/004 24/3.13 |
| 7,909,004 | B2 | * | 3/2011 | Thompson | A01K 27/004 119/795 |
| 2009/0120375 | A1 | * | 5/2009 | Dyer | A01K 27/004 119/769 |
| 2014/0238313 | A1 | * | 8/2014 | Daniels | A01K 27/004 119/796 |

* cited by examiner

*Primary Examiner* — Ruth Ilan

(57) ABSTRACT

Provided is an animal leash with leash strap retractable through an ergonomic hand grip which is releasably fixed to said leash at any length position along the leash strap, and is quickly adjusted by simple push button release and manual repositioning. Leash is fixed against being pulled through handle in either direction until user presses release button, at which time leash may be pulled back to quickly restrain the animal, or pulled forward to allow more length freedom. Handle is equipped with wrist strap to better secure it to handler.

3 Claims, 2 Drawing Sheets

CINCH GRIP LEASH WITH LOCKING POSITIONABLE HAND GRIP

CROSS-REFERENCE TO RELATED APPLICATIONS

This application claims an invention which was disclosed in Provisional Application No. 62/051,418, filed Sep. 17, 2014, entitled "Cinch Grip Leash with Locking Positionable Hand Grip". The benefit under 35 USC §119(e) of the United States provisional application is hereby claimed, and the aforementioned application is hereby incorporated herein by reference.

REFERENCES CITED

U.S. Pat. No. 7,909,004, Cam-Lock Leash
U.S. Pat. No. 4,391,226, Dog Leash

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention pertains to the field of large dog control and animal leashes. More particularly, the invention relates to large dog handling equipment for changing situations which require changing leash length quickly. For instance, a police dog may be on a normal 3 foot to 5 foot long leash for patrol or scene investigation, but may need to be sharply restrained when encountering a person or animal.

There is a need for a leash with a strong ergonomic handle which fixes securely to the leash strap at adjustable positions and cannot be moved from a position in either direction along the leash without handler action, can be quickly pulled in to a shorter operating length against the pull of a large animal, and is easy to secure to the handler's hand or wrist.

Previous devices with related purposes are described in U.S. Pat. No. 7,909,004 and U.S. Pat. No. 4,391,226. These and other attempts to address similar needs fail to provide adequate securing to handler, fail to lock handle to strap in both directions, or fail to provide means to strongly retract against an animal's pull.

BRIEF SUMMARY OF THE INVENTION

The subject item, referred to as the Cinch Grip Leash, is a device suitable for dog or other animal restraint with normal full operating length which may be 3 feet to 5 feet or longer full length, which with the press of a release button, may be pulled in to any arbitrarily chosen shorter length, whereupon ceasing to press the release button locks the grip handle to the leash strap at the new position against longitudinal movement in either direction. This action allows the handler to quickly retract the dog for close control using the handler's strength rather than a weaker leash reel spring, enabling control of large strong dogs, and also prevents movement of the grip handle from the chosen position along the leash strap in either direction without pressing the release button. Further, the adjustable position grip handle is equipped with a wrist strap to more securely retain the grip handle in the handlers hand.

In the preferred embodiment of the Cinch Grip Leash, the leash strap passes through the body of the grip handle, with one end disposed toward the dog and the other end toward the handler. The grip handle contains a stop mechanism which prevents longitudinal movement of the leash strap through the handle in either direction unless released by the user pressing a release button on the grip handle.

In the preferred embodiment, the stop mechanism is comprised of two rollers on shafts in a pivoting cage, forming a pivoting roller assembly, such that, unless the pivoting roller assembly rotation is limited by the handler pressing the release button, any pulling force on either end of the leash strap wrapped around the rollers causes the pivoting roller assembly to rotate such that the leash strap wrapped around the rollers jams between the two rollers and the two internal grip handle walls forming an enclosure surrounding the rollers and leash strap, preventing further motion in either longitudinal direction. If the handler presses the release button connected to the pivoting roller assembly to disengage the stop mechanism, the rollers are moved away from the internal grip handle walls and the leash is free to roll through the pair of rollers, thus allowing the handler to reset the position of the grip handle along the leash length in either longitudinal direction.

In the preferred embodiment of the Cinch Grip Leash, a wrist strap is affixed to the grip handle to enhance holding security, preventing the handle from being pulled out of the handler's hand by a sudden or surprising motion of the dog.

Additionally, the handle of the Cinch Grip Leash may be designed with textural features and shape features which ergonomically and through enhanced friction, improve the handler's grip of the handle.

DETAILED DESCRIPTION OF THE INVENTION

Figure 1:
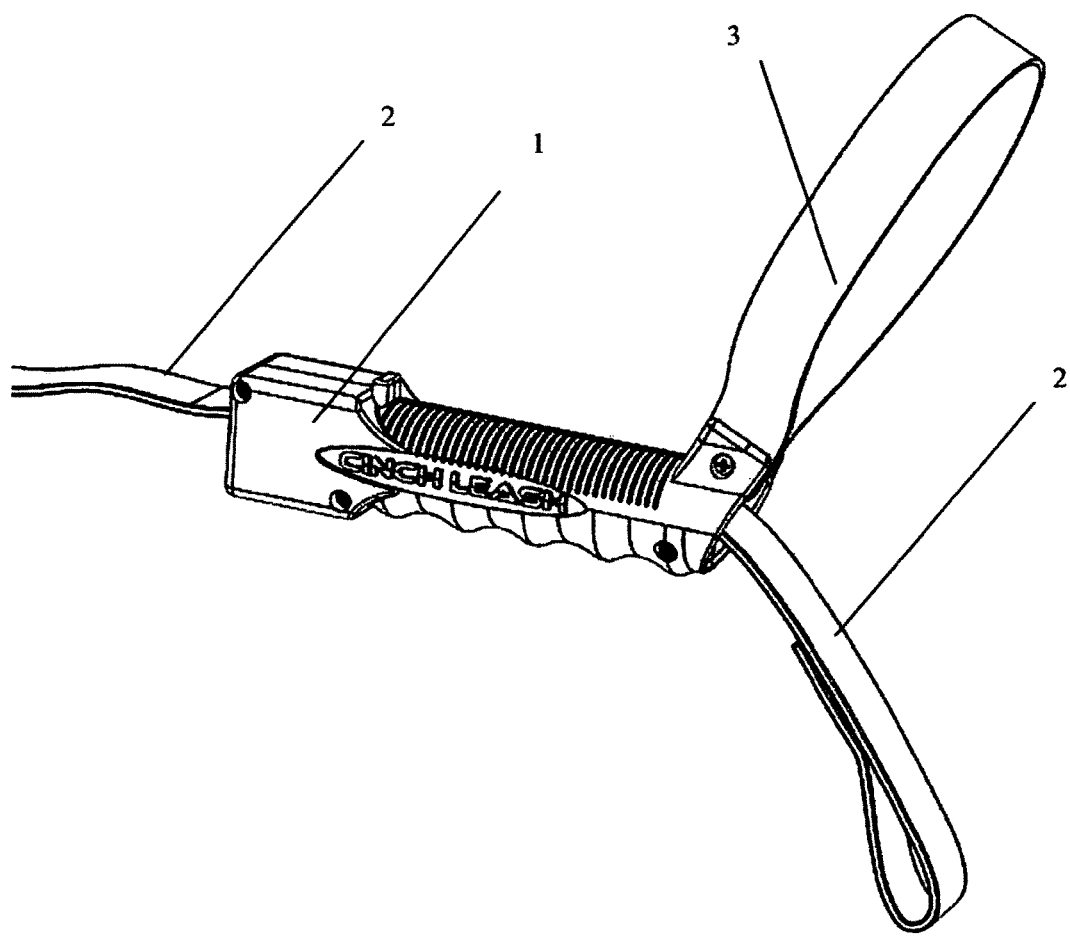
FIG. 1 is a view of a Cinch Grip Leash, showing a Grip Handle 1, a Leash Strap 2, and a Wrist Strap 3.

Referring now to the device in more detail, in FIG. 1 there is shown Cinch Grip Leash with Grip Handle 1 having ergonomic gripping features in its shape and surface texture, Leash Strap 2 with its animal attachment end disposed to the left of the figure and its handler end disposed to the right of the figure, and its central portion passing through Grip Handle 1. Also shown is Wrist Strap 3, used to assist the handler in securely holding Grip Handle 1 against sudden motions of the animal. Wrist Strap 3 is arranged at an angle at the rear of Grip Handle 1 so as to facilitate ergonomic encirclement of the handler's wrist when the handler's hand is gripping Grip Handle 1.

Figure 2:
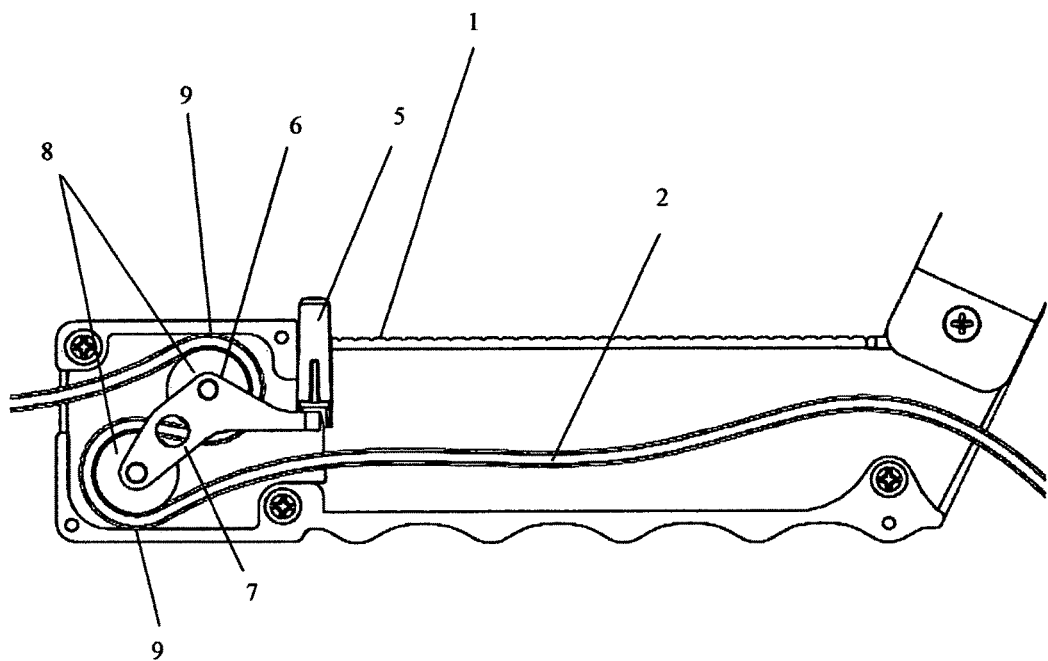
FIG. 2 is a section view showing the Cinch Grip Leash in its locked condition preventing longitudinal motion of Leash Strap 2 through Grip Handle 1. A Release Button 5 is in its undepressed position and Leash Strap 2 is pinched between two Rollers 8 and two areas 9 of Grip Handle 1.

Referring now to the device in more internal detail, in FIG. 2 there is shown the Cinch Grip Leash sectioned to reveal the interior in the "locked" condition caused by longitudinal force on Leash Strap 2. Such force may be applied in either direction, by pull of the animal or the handler, resulting in this jammed position due to rotation of a Pivoting Roller Assembly 6 in a counter-clockwise direction around a Pivot Center 7. As longitudinal force in Leash Strap 2 is applied in either direction, torsion is applied to Pivoting Roller Assembly 6 through pull of Leash Strap 2 on two Rollers 8 until jamming occurs at two regions 9 of the diagram due to the restrictive size of the enclosure formed by the walls of Grip Handle 1. Further such pulling force results in tighter jamming and Leash Strap 2 is locked from moving through Grip Handle 1 in either longitudinal direction.

Figure 3:
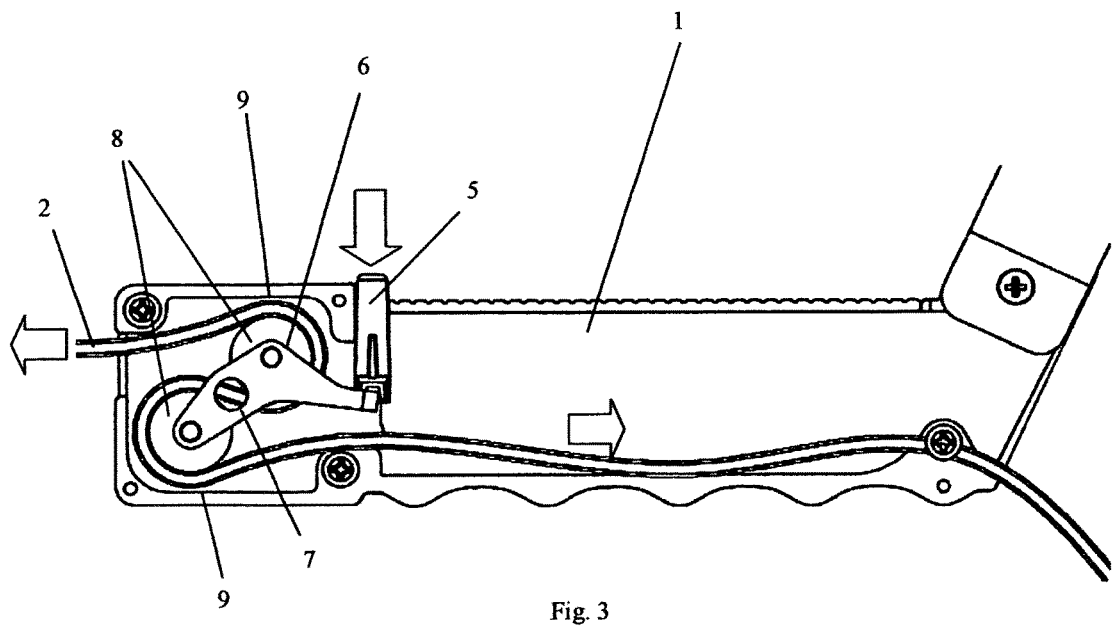
FIG. 3 is a section view showing the Cinch Grip Leash in its released condition allowing longitudinal motion of Leash Strap 2 through Grip Handle 1. Release Button 5 is in its depressed position and areas 9 of Grip Handle 1 are now clear for unrestricted leash motion.

Referring now to FIG. 3 there is shown a Cinch Grip Leash sectioned to reveal the interior in the "unlocked" condition caused by pressure on Release Button 5, which in turn rotates Pivoting Roller Assembly 6 about Pivot Center 7 in a clockwise direction such that Rollers 8 and the Leash Strap 2 are not interfering with Grip Handle 1 interior wall at regions 9. In this position, no binding forces exist and Leash Strap 2 is free to wind around Rollers 8 and proceed in either direction pulled. In this way, the Grip Handle 1 may be repositioned along the length of Leash Strap 2, or otherwise stated, Leash Strap 2 may be repositioned along its length within Grip Handle 1, facilitating tighter or looser animal control.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention. Nor should illustrative mention of dogs or large dogs in the descriptions imply limited use for the invention, as it may just as well be applied to other animals or smaller dogs, or even used for inanimate objects such as in lifting straps for rigging, or tow straps for carts.

We claim:

1. An animal control leash device comprising:
   a leash strap with an animal attachment end and an animal handler end;
   a grip handle with passageway through its body for the leash strap;
   a stop mechanism within said body which stops travel of the leash strap in both longitudinal directions until disengaged;
      wherein said stop mechanism comprises:
         a pivoting roller assembly with a pair of rollers around which said leash strap is wrapped such that pull forces on either end of said leash strap cause the pivoting roller assembly to rotate, and
         an enclosure surrounding said pivoting roller assembly restrictively sized such that said pivoting roller assembly with leash strap wrapped around its rollers must interfere with and jam against walls of said enclosure before completing a revolution in response to said pull forces on said leash strap,
   and
   means for selectively disengaging said stop mechanism;
      wherein said means for selectively disengaging said stop mechanism limits rotation of said pivoting roller assembly to prevent interference with the enclosure walls, thus allowing said leash strap to feed through the pivoting roller assembly without jamming.

2. An animal control leash device as in claim 1 wherein said means for selectively disengaging said stop mechanism is a release button connected to said pivoting roller assembly.

3. An animal control leash device as in claim 1 wherein said grip handle is equipped with a wrist strap to assist user in securely holding the device.

* * * * *